US011264786B2

(12) United States Patent
Thomas et al.

(10) Patent No.: US 11,264,786 B2
(45) Date of Patent: Mar. 1, 2022

(54) APPARATUS FOR SECURING TOGETHER A BUNDLE OF CONDUCTORS

(71) Applicant: The Boeing Company, Chicago, IL (US)

(72) Inventors: Daniel Thomas, Summerville, SC (US); Jeffrey R. Dempsey, Mount Pleasant, SC (US); Jonathan Marsh, Charleston, SC (US)

(73) Assignee: The Boeing Company, Chicago, IL (US)

( * ) Notice: Subject to any disclaimer, the term of this patent is extended or adjusted under 35 U.S.C. 154(b) by 14 days.

(21) Appl. No.: 16/804,231

(22) Filed: Feb. 28, 2020

(65) Prior Publication Data

US 2021/0273435 A1 Sep. 2, 2021

(51) Int. Cl.

| *F16L 3/08* | (2006.01) |
| *F16L 3/22* | (2006.01) |
| *H02G 3/30* | (2006.01) |
| *H02G 3/32* | (2006.01) |
| *B60R 16/02* | (2006.01) |
| *F16L 3/26* | (2006.01) |
| *F16L 3/23* | (2006.01) |

(52) U.S. Cl.
CPC ............ *H02G 3/32* (2013.01); *B60R 16/0215* (2013.01); *F16L 3/08* (2013.01); *F16L 3/22* (2013.01); *F16L 3/23* (2013.01); *F16L 3/26* (2013.01); *H02G 3/30* (2013.01)

(58) Field of Classification Search
CPC ..... H02G 3/32; H02G 3/30; F16L 3/22; F16L 3/23; F16L 3/26; F16L 3/08; B60R 16/0215
See application file for complete search history.

(56) References Cited

U.S. PATENT DOCUMENTS

| 2,354,919 | A | * | 8/1944 | Lockwood | ............ F16L 3/2235 248/68.1 |
| 3,944,175 | A | * | 3/1976 | Kearney | .................. E21F 17/02 248/59 |
| 4,431,152 | A | * | 2/1984 | Reed, Jr. | .............. H02G 3/0683 248/65 |
| 6,126,122 | A | * | 10/2000 | Ismert | ..................... F16L 3/243 248/74.1 |
| 6,446,915 | B1 | * | 9/2002 | Ismert | ..................... F16L 3/243 248/68.1 |
| 9,534,709 | B2 | * | 1/2017 | Wilson | ..................... F16L 3/227 |
| 2009/0250559 | A1 | * | 10/2009 | Benoit | ..................... F16L 5/027 248/49 |

* cited by examiner

*Primary Examiner* — Tan Le
(74) *Attorney, Agent, or Firm* — Quinn IP Law

(57) ABSTRACT

An apparatus used in securing together a bundle of conductors has a support structure with an edge surface having a plurality of notches provided in the edge surface. Each notch of the plurality of notches has an open space dimensioned for receiving a bundle of conductors in the open space. A plurality of clamps are provided that are attachable to the edge surface with each clamp extending over a notch of the plurality of notches and over a bundle of conductors positioned in the open space of the notch. The clamps attached to the edge surface of the support structure over the bundle of conductors positioned in the notch in the edge surface secures the bundle of conductors in the open space of the notch.

20 Claims, 4 Drawing Sheets

APPARATUS FOR SECURING TOGETHER A BUNDLE OF CONDUCTORS

FIELD

This disclosure pertains to an apparatus used in securing together a bundle of conductors. The apparatus has a support structure with an edge surface that extends along an exterior of the support structure. A plurality of notches are provided in the edge surface. Each notch of the plurality of notches has an open space in the notch. A plurality of clamps are provided. Each clamp of the plurality of clamps is attachable to the edge surface with the clamp extending over a notch of the plurality of notches and over a bundle of conductors positioned in the open space of the notch with the clamp securing the bundle of conductors in the open space in the notch.

BACKGROUND

Current methods of securing wire harnesses or bundles of conductors to an aircraft structure require tools that can cause damage to the wires. For example, a current method of securing a wire harness or bundle of conductors to an aircraft structure involves a ring post previously secured to the aircraft structure and one or more zip ties. A zip tie is threaded through the ring post and wrapped around the wire harness or bundle of conductors. The tail of the zip tie is then inserted through the head of the zip tie and pulled, tightening the zip tie around the ring post and the wire harness or bundle of conductors. The tail end of the zip tie is then cut and removed.

The cutting of the zip tie tail is frequently performed improperly. This presents a sharp edge to the cut zip tie tail. The sharp edge can function as a knife edge to personnel working in the area of the cut zip tie tail and to adjacent wiring.

Additionally, when a wire of the wire harness or bundle of conductors previously secured to a ring post by a zip tie needs to be removed from the harness or bundle, it is necessary for the previously installed zip tie to be cut and removed from the wire harness or bundle of conductors. The tool required to cut the previously installed zip tie to remove a wire can cause damage to adjacent wires. This damage can lead to situations where removal of an individual wire presents a high risk to other wires in the wire harness or bundle of conductors of damage during the replacement process.

SUMMARY

The apparatus for securing together a bundle of conductors or a wire harness of this disclosure provides a support structure that meets requirements for safe installation of a bundle of conductors on the apparatus, as well as the requirements for post installation repair and rework requirements of the bundle of conductors.

The apparatus includes a support structure having a number of edge surfaces that each extend along an exterior length of the support structure. A plurality of notches are provided in each of the edge surfaces. Each of the notches has an open space in the notch dimensioned to receive a bundle of conductors in the open space.

A plurality of clamps are attachable to each edge surface with each clamp extending over a notch in the edge surface and over a bundle of conductors positioned in the open space of the notch. The clamp secures the bundle of conductors in the open space in the notch.

Each notch and its associated clamp is provided with biasing parts that engage against the bundle of conductors positioned in the open space of the notch. The biasing parts push the bundle of conductors together. The biasing parts include resilient materials on the plurality of clamps. The resilient materials are positioned on the clamps to engage against the bundles of conductors positioned in the open spaces of the plurality of notches and push the bundles of conductors together. The biasing parts also include a plurality of springs on the support structure. Each spring extends into an open space of a notch in the support structure and engages against the bundle of conductors positioned in the open space of the notch and pushes the bundles of conductors together.

Each of the clamps has a pair of posts that project from the clamp. The pair of posts on each clamp are positioned to be received in pairs of holes in the edge surface of the support structure where the pairs of holes are positioned on opposite sides of each notch in the edge surface. Each post has a pair of rims on the post. A first rim of each pair of rims has a diameter dimension that is smaller than the second rim of each pair of rims. With the pairs of posts inserted into pairs of holes on the opposite sides of each notch, the first rims engaging in the pair of holes removably secure the clamp to the edge surface. With further insertion of the pairs of posts into the pair of holes to where the second rims are inserted into the pairs of holes, the clamp is secured to the edge surface over the notch and is prevented from being removed from the edge surface.

Openings are provided in the support structure adjacent the edge surface. The openings provide access to the pairs of posts inserted into the pairs of holes in the edge surface. The access enables a specialized tool to be inserted into the openings to cut the pairs of posts of a clamp, and thereby enable removal of the clamp from the edge surface.

The features, functions, and advantages that have been discussed can be achieved independently in various embodiments or may be combined in yet other embodiments, further details of which can be seen with reference to the following description and drawings.

DETAILED DESCRIPTION

Figure 1:
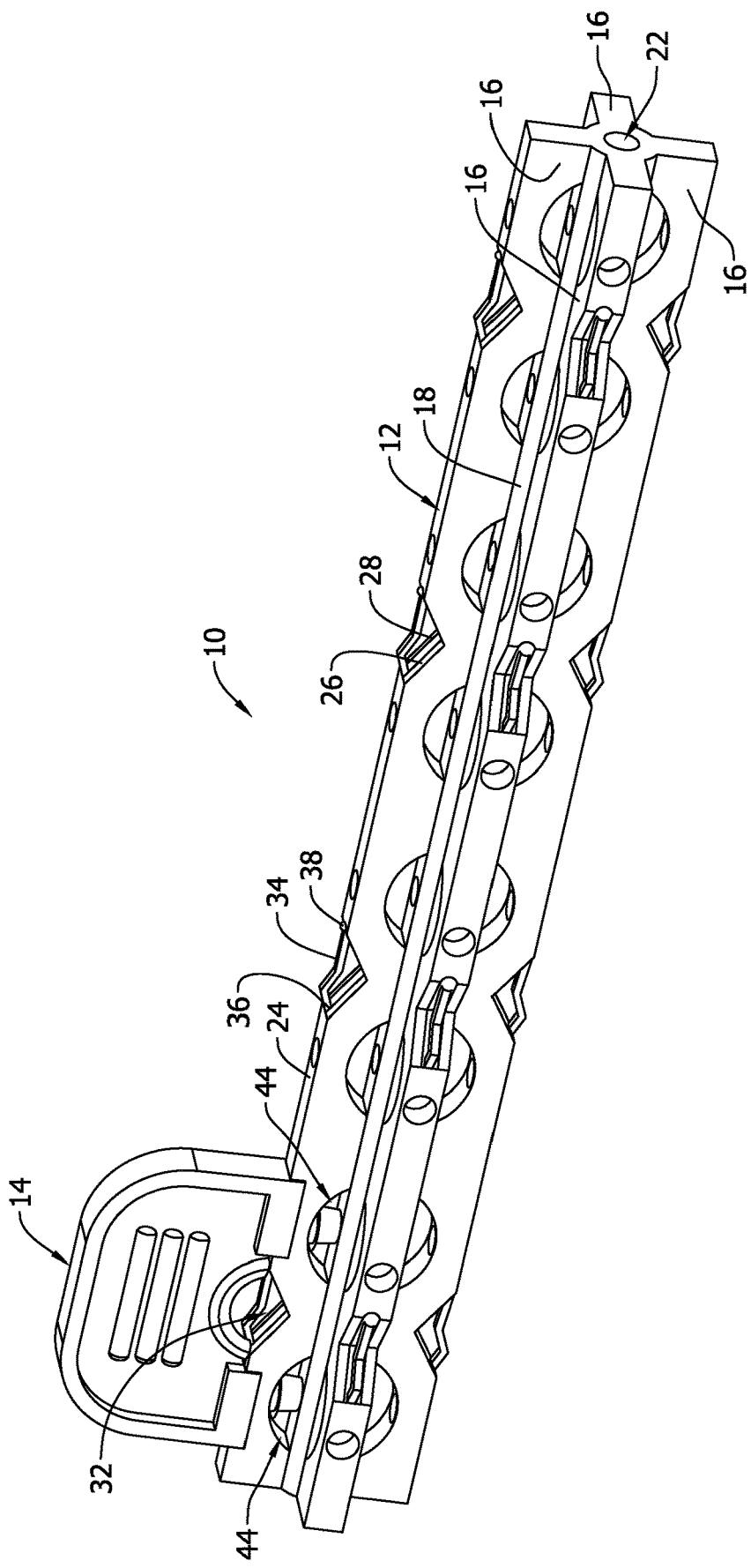
FIG. 1 is a representation of a perspective view of the apparatus for securing together a bundle of conductors that is the subject of this disclosure.

FIG. 1 is a representation of a perspective view of the apparatus 10 for securing together a bundle of conductors. In the representation of FIG. 1, the apparatus 10 is shown comprised of a support structure 12 and a clamp 14. Although only one clamp 14 is represented in FIG. 1, it should be understood that the apparatus 10 is comprised of a plurality of clamps 14. Each of the clamps 14 of the plurality of clamps that go into the apparatus 10 are constructed in substantially an identical manner. Therefore, only one of the clamps 14 is described herein. It should be understood that each of the clamps 14 of the plurality of clamps has a substantially identical structure. The support structure 12 and each of the plurality of clamps 14 is constructed of an inexpensive and lightweight material. Examples of the materials that go into the construction of the support structure 12 and the clamps 14 include plastics, composites, lightweight metals and other equivalent types of materials.

Figure 2:
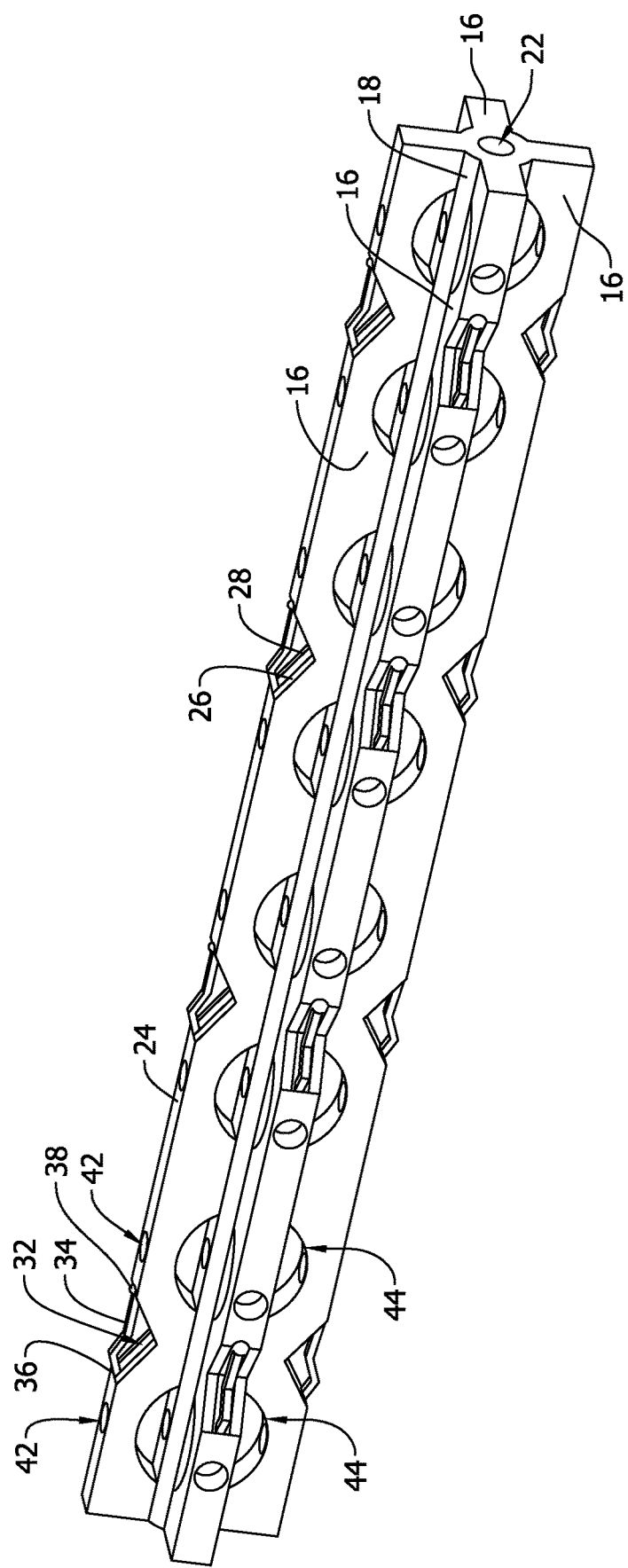
FIG. 2 is a representation of a perspective view of the support structure of the apparatus with a clamp of the apparatus represented in FIG. 1 removed from the support structure.
Figure 3:
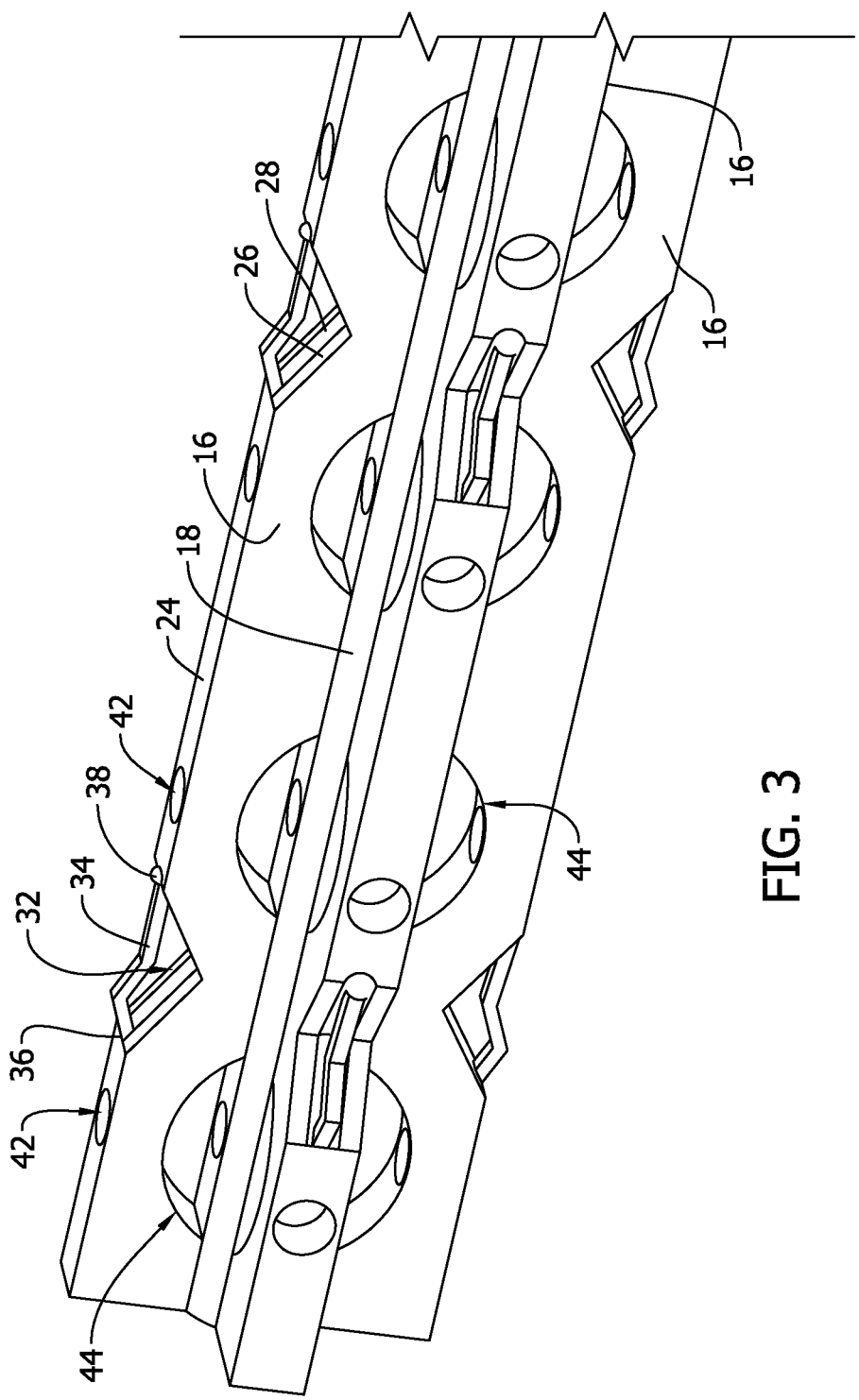
FIG. 3 is a representation of an enlarged view of an end of the support structure represented in FIG. 2.

The support structure 12 has an elongate length and is comprised of four legs or walls 16. The walls 16 are secured together and have a plus sign (+) cross-section configuration. Four walls 16 are represented in FIGS. 1-3. The support structure 12 could be constructed with different numbers of walls, for example two walls, one wall or three walls. Each of the walls 16 are secured together in the plus sign (+) cross-section configuration at a central base 18 of the support structure 12. The central base 18 extends along the entire elongate configuration of the support structure 12 and connects the four walls 16 together in the plus sign (+) cross-section configuration. A bore hole 22 extends through the entire length of the base 18. The bore hole 22 could be used as a fastener hole to attach the support structure 12 to a separate structure of an aircraft. Each of the walls 16 has a same construction, and therefore the construction of only one of the walls 16 is described herein. It should be understood that each of the walls 16 has the same construction to be described.

As represented in FIGS. 1-3, the wall 16 has an edge surface 24 that extends along the entire elongate length of the wall. The edge surface 24 is a flat, planar surface along its entire length. The wall 16 could have a solid construction along its entire length, or could be constructed of a pair of panels 26, 28 positioned side by side with a hollow interior space between the pair of panels as represented in FIGS. 1-3.

A plurality of notches 32 are formed into the edge surface 24 of the wall 16. The notches 32 are each represented as having a "V" configuration in FIGS. 1-3. However, the notches 32 could have other equivalent configurations extending into the wall 16 from the edge surface 24 of the wall. Each of the notches 32 has an open space in the notch dimensioned to receive a bundle of conductors in the open space. As represented in FIGS. 1-3, the open space of each of the notches 34 has substantially a same size and volume. However, the notches 34 could be formed in the edge surface 24 having different configurations, different sizes and different volumes.

A biasing part or spring 34 is provided in each of the notches 32. Each spring 34 is represented in FIGS. 1-3 as being a flat spring that extends between a first end 36 of the spring and an opposite second end 38 of the spring. Other equivalent types of springs, for example coil springs could be provided in the notices 32. The first end 36 of each spring 34 is secured to the wall 16 adjacent the edge surface 24 of the wall. The spring 34 extends from the first end 36 of the spring, into the open space of the notch 32 associated with the spring to the second end 38 of the spring. The second end 38 of the spring is free to move in the open space of the notch 32. The length of the spring 34 is resilient. Thus, when a bundle of conductors is positioned in the open space in the notch 32, the bundle of conductors pushes against the spring 34 and the resilience of the spring 34 pushes the bundle of conductors together.

Pairs of holes 42 extend into the edge surface 24 of the wall 16. The holes of each pair of holes 42 is represented as having a circular cross-section configuration. However, the holes could have other equivalent cross-section configurations. Each pair of holes 42 is positioned on opposite sides of a notch 32. The holes 42 of each pair of holes are dimensioned to receive a mounting post of pairs of mounting posts on the clamps 14 that are yet to be described.

A plurality of openings 44 are provided through the wall 16. The plurality of openings 44 are positioned adjacent the central base 18 of the support structure 12. The openings 44 are represented in FIGS. 1-3 as having a semi-circular configuration. However, the openings 44 could have other configurations. Each of the openings 44 communicates with one of the holes 42 that extend into the edge surface 24 of the support structure 12. The openings 44 are dimensioned and configured to receive a specialized tool in the openings 44 that is used to cut a yet to be described mounting post of the clamps 44 inserted into the hole 42 that communicates with the opening 44.

Figure 4:
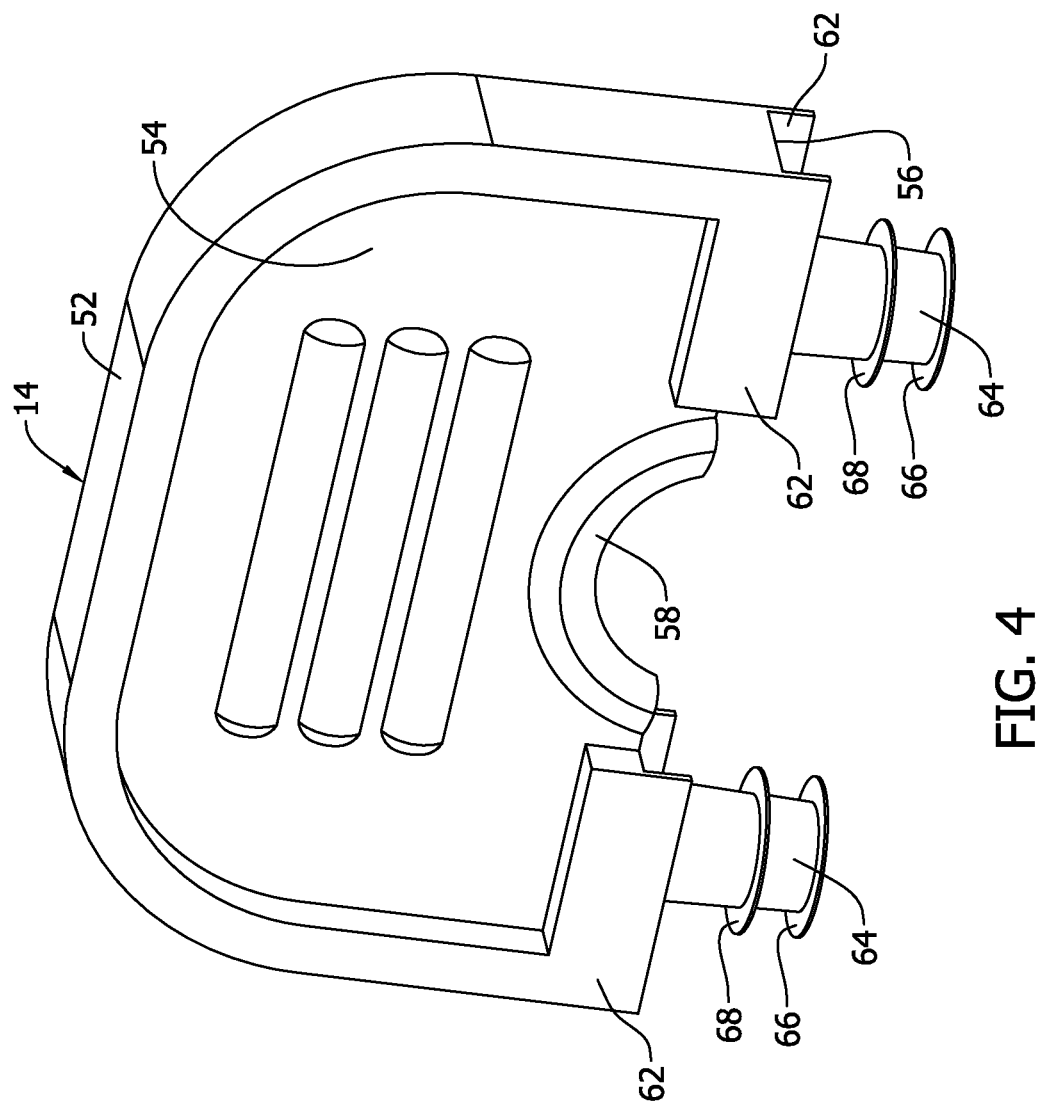
FIG. 4 is a representation of a clamp of the apparatus removed from the support structure.

FIG. 4 is a representation of a clamp 14 of the plurality of clamps. The clamp 14 has a free edge 52 that extends around a majority of a body 54 of the clamp. The body 54 of the clamp functions as a handle for manually gripping the clamp 14. Opposite the free edge 52 of the clamp 14, the clamp has an engagement surface 56 that extends across the body 54 of the clamp. The clamp engagement surface 56 has a width dimension that is substantially the same as a width dimension of the edge surface 24 of the wall 16 of the support structure 12. The engagement surface 56 is a flat, planar surface along a majority of its length. However, there is a curved surface 58 on the clamp 14 positioned between portions of the engagement surface 56. The clamp curved surface 58 has a length dimension across the curved surface that is substantially the same dimension as the length dimension across a notch 32 in the wall 16 of the support structure 12. The clamp body 54 along the curved surface 58 is formed of a resilient material that forms the curved surface 58 as a biasing part of the clamp 14. The resilient material of the curved surface 58 is positioned on the clamp 14 to engage against a bundle of conductors positioned in an open space of a notch 32 and push the bundle of conductors together when the clamp 14 is attached to the edge surface 24 of the support structure 12, in a manner to be described.

Pairs of side walls 62 project outwardly from the clamp body 54 on opposite sides of the engagement surface 56. The pairs of side walls 62 are positioned to engage over portions of the wall 16 on opposite sides of the wall when the clamp 14 is attached to the edge surface 24 of the wall. The pairs of flanges 62 assist in securely attaching the clamp 14 to the edge surface 24 of the wall 16. The pairs of flanges 62 also prevent any prying tool from being inserted between the engagement surface 56 of the clamp and the edge surface 24 of the wall 16 when the clamp 14 is attached to the wall 16.

Pairs of posts 64 project from the clamp engagement surface 56 on opposite sides of the clamp curved surface 58. Each pair of posts 64 is positioned and dimensioned to be inserted into a pair of holes 42 on the opposite sides of the notches 32 in the edge surface 24 of the wall 16. Each post of the pair of posts 64 has a cross-section configuration that matches the cross-section configuration of the holes 42 and has a length dimension that enables the pair of posts 64 to extend through the pair of holes 42 in which they are inserted and appear in the openings 44 that communicate with the pair of holes 42.

As represented in FIG. 4, each of the posts 64 has a pair of rims 66, 68 that extend completely around the post. A first rim 66 of each pair of rims has a diameter dimension that is smaller than the second rim 68 of each pair of rims. The diameter dimensions of the rims 66, 68 are slightly smaller than the diameter dimensions of the pair of holes 64 on the opposite sides of each notch 32 in the edge surface 24 of the wall 16. The rims 66, 68 are used to hold the clamp 14 on the edge surface 24 of the wall 16 in a manner to be described. Other structures equivalent to the rims 66, 68 could be used to hold the clamp 14 on the edge surface 24 of the wall 16.

In use of the apparatus 10, a bundle of conductors, for example a wire harness is positioned in one or more of the open spaces of the notches 32. The bundle of conductors could be positioned in a notch 32 in one of the walls 16, and could also be positioned in notches 32 in two of the walls 16. With the bundle of conductors positioned in a notch 32, the spring 34 in the notch engages against the bundle of conductors and biases the bundle of conductors together.

A clamp 14 is then positioned over the notch 32 having the bundle of conductors. The posts 64 of the clamp 14 are aligned with the pair of holes 42 positioned on opposite sides of the notch 32 containing the bundle of conductors. The clamp 14 is manually pushed toward the edge surface 24 of the wall 16, causing the pair of posts 64 to be inserted into the pair of holes 42. When the pair of posts 64 are pushed into the pair of holes 42 to the point that the first rims 66 on the posts 64 are inserted in the holes 42 and beyond the edge surface 24, the first rims 66 hold the clamp 14 to the edge surface 24 of the wall 16. However, because the first rim 66 have diameters that are smaller than the second rims 68, the clamp 14 could still be manually pulled from the edge surface 24 of the wall 16.

When the clamp 14 is manually pushed onto the edge surface 24 of the wall 16 to the extent that the second rims 68 are pushed into the pair of holes 42 beyond the edge surface 24 of the wall 16, the engagement surface 56 of the clamp 14 engages against the edge surface 24 of the wall 16. The pair of flanges 64 on the opposite sides of the clamp 14 engage over the opposite sides of the wall 16. The second rims 68 positioned in the pair of holes 42 securely hold the clamp 14 to the edge surface 24 of the wall 16 and prevent the clamp 14 from being manually removed from the wall 16. The resilient material of the clamp curve surface 56 engages against the bundle of conductors on the opposite side of the spring 34 and biases the bundle of conductors together.

When the clamp 14 is positioned on the wall 16 where the engagement surface 56 of the clamp engages against the edge surface 24 of the wall 16, the pair of posts 64 on the clamp 14 appear in the openings 44 in the wall 16. The first rims 66 and second rims 68 on the pair of posts 64 also appear in the openings 44 in the side of the wall 16. The pair of posts 64 and the rims 66, 68 are accessible in the openings 44 to a specialized tool that can be inserted into the openings 44 to cut the pair of posts 64 and separate the rims 66, 68 from the remainders of the posts 64. This enables the clamp 14 to then be removed from the edge surface 24 of the wall 16.

As various modifications could be made in the construction of the apparatus for securing together a bundle of conductors and its method of use herein described and illustrated without departing from the scope of the invention, it is intended that all matter contained in the foregoing description or shown in the accompanying drawings shall be interpreted as illustrative rather than limiting. Thus, the breadth and scope of the present disclosure should not be limited by any of the above described exemplary embodiments, but should be defined only in accordance with the following claims appended hereto and their equivalents.

The invention claimed is:

1. An apparatus for securing together a bundle of conductors, the apparatus comprising:
    a support structure, the support structure having an edge surface extending along an exterior of the support structure;
    a notch in the edge surface;
    a clamp, the clamp being attachable to the edge surface with the clamp extending over the notch and over a bundle of conductors positioned in the notch with the clamp securing the bundle of conductors in the notch;
    a hole in the edge surface, the hole being positioned on the edge surface adjacent the notch;
    a post on the clamp, the post on the clamp being dimensioned for insertion into the hole in the edge surface when attaching the clamp to the edge surface; and,
    a side opening in the support structure, the side opening exposing the post of the clamp inserted into the hole in the edge surface, the side opening being dimensioned to enable insertion of a tool into the side opening for cutting the post and removing the clamp from the edge surface.

2. The apparatus of claim 1, further comprising:
    a biasing part that engages against the bundle of conductors positioned in the notch and pushes the bundle of conductors together.

3. The apparatus of claim 2, further comprising:
    the biasing part being a resilient material on the clamp.

4. The apparatus of claim 2, further comprising:
    the biasing part being a spring on the support structure, the spring extends into the notch and engages against the bundle of conductors positioned in the notch and pushes the bundle of conductors together.

5. The apparatus of claim 4, further comprising:
    the spring being a flat spring having a length between opposite first and second ends of the flat spring, the first end of the flat spring is secured to the support structure and the length of the flat spring extends into the notch to the second end of the flat spring in the notch.

6. The apparatus of claim 1, further comprising:
    a rim on the post, the rim being dimensioned to compress when the post is inserted into the hole in the edge surface and expand when the rim is inserted through the hole in the edge surface.

7. The apparatus of claim 6, further comprising:
    the rim on the post being a first rim on the post, the first rim having a first diameter dimension; and,
    a second rim on the post, the second rim having a second diameter dimension, the second diameter dimension being larger than the first diameter dimension.

8. The apparatus of claim 1, further comprising:
    the edge surface is one of a multiple of edge surfaces extending along the exterior of the support structure; and,
    the clamp is attachable to each edge surface of the multiple of edge surfaces.

9. The apparatus of claim 1, further comprising:
    the support structure having a plurality of walls;
    the edge surface is one edge surface of a plurality of edge surfaces; and
    each edge surface of the plurality of edge surfaces extends along a wall of the plurality of walls.

10. An apparatus for securing together bundles of conductors, the apparatus comprising:
    a support structure, the support structuring having an edge surface extending along an exterior of the support structure;

a plurality of notches in the edge surface, each notch of the plurality of notches having an open space in the notch;

a plurality of clamps, each clamp of the plurality of clamps being attachable to the edge surface with the clamp extending over a notch of the plurality of notches and over a bundle of conductors positioned in the open space of the notch with the clamp securing the bundle of conductors in the open space in the notch;

pairs of holes in the edge surface, each pair of holes being positioned on the edge surface on opposite sides of a notch of the plurality of notches in the edge surface; and, pairs of posts on each clamp of the plurality of clamps, each pair of posts on each clamp being dimensioned for insertion into the pairs of holes in the edge surface on the opposite sides of each notch in the edge surface when attaching each clamp to the edge surface.

11. The apparatus of claim 10, further comprising:

a plurality of biasing parts that engage against the bundles of conductors positioned in the open spaces of the plurality of notches and push the plurality of bundles of conductors together.

12. The apparatus of claim 11, further comprising:

the plurality of biasing parts being resilient materials on the plurality of clamps that are positioned on the clamps to engage against the bundles of conductors positioned in the open spaces of the plurality of notches to push the bundles of conductors together.

13. The apparatus of claim 11, further comprising:

the plurality of biasing parts being a plurality of springs on the support structure, each spring of the plurality of springs extending into the open space of each notch of the plurality of notches and engaging against the bundle of conductors positioned in the open space of each notch of the plurality of notches.

14. The apparatus of claim 13, further comprising:

each spring being a flat spring having a length between opposite first and second ends of the flat spring, the first end of each flat spring being secured to the support structure and the length of each flat spring extending into the open space of each notch of the plurality of notches to the second end of the flat spring.

15. The apparatus of claim 10, further comprising:

a rim around each post of the pairs of posts on each clamp of the plurality of clamps, the rim around each post being dimensioned to compress when the post is inserted into the hole in the edge surface and expand when the rim is inserted through the hole in the edge surface.

16. The apparatus of claim 15, further comprising:

the rim on each post of the pairs of posts on each clamp of the plurality of clamps being a first rim on the post, the first rim having a first diameter dimension; and, a second rim on each post of the pairs of posts on each clamp of the plurality of clamps, the second rim having a second diameter dimension, the second diameter dimension being larger than the first diameter dimension.

17. The apparatus of claim 10, further comprising:

a plurality of side openings in the support structure, each side opening of the plurality of side openings exposing the pairs of posts of each clamp of the plurality of clamps inserted into the pairs of holes in the edge surface on the opposite sides of each notch in the edge surface, each side opening being dimensioned to enable insertion of a tool into the side opening for cutting the pairs of posts exposed by the side opening and removing the clamp having the cut pair of posts from the edge surface.

18. The apparatus of claim 10, further comprising:

the edge surface is one of a multiple of edge surfaces extending along the exterior of the support structure; and, each clamp of the plurality of clamps is attachable to each edge surface of the multiple of edge surfaces.

19. The apparatus of claim 10, further comprising:

the support structure having a plurality of walls;

the edge surface is one edge surface of a plurality of edge surfaces; and each edge surface of the plurality of edge surfaces extends along a wall of the plurality of walls.

20. The apparatus of claim 19, further comprising:

the plurality of notches are in the plurality of edge surfaces.

* * * * *